United States Patent Office 3,669,647
Patented June 13, 1972

---

3,669,647
METHOD OF RECOVERING METALLIC BRASS FROM THE SKIMMING OF A BRASS MELTING FURNACE
Alfred R. Barbour, Pittsburgh, Pa., assignor to Roessing Bronze Company, Mars, Pa.
No Drawing. Continuation of application Ser. No. 661,785, Aug. 21, 1967. This application Dec. 22, 1969, Ser. No. 887,358
Int. Cl. C22b 15/14, 19/30
U.S. Cl. 75—76                                    4 Claims

ABSTRACT OF THE DISCLOSURE

A method of recovering metallic brass from the skimmings of a brass melting furnace, which skimmings may consist of approximately equal parts of metal and metal oxides, comprising heating the skimmings to a temperature somewhat above the melting point of the metal in the presence of a fluxing agent comprising oxide of boron (for example, in anhydrous Rasorite concentrate) and sodium carbonate which causes formation of a slag blanket and reducing the viscosity of the slag blanket by adding metal which remains in the slag blanket and combines with oxygen, significantly increasing the amount of metallic brass which coalesces into droplets which settle from the slag blanket. The added metal may comprise at least one of the metals of the group consisting of calcium, aluminum, silicon, manganese and titanium. In the heating step the components may be present in approximately the following proportions: 25,000 pounds of skimmings, 715 to 1430 pounds of oxide of boron (for example, in 1100 to 2200 pounds of anhydrous Rasorite concentrate), 100 pounds of sodium carbonate and 50 pounds of metal which remains in the slag blanket and combines with oxygen.

---

This application is a continuation of my copending application Ser. No. 661,785, filed Aug. 21, 1967, now abandoned.

This invention relates to a method of recovering metallic brass from the skimmings of a brass melting furnace and particularly to a method whereby the amount of metallic brass which coalesces into droplets which settle from the slag blanket atop the skimmings is significantly increased.

It is well known to those skilled in the art that the skimmings of a brass melting furnace contain a considerable quantity of metallic brass the recovery of which is highly desirable. Attempts to recover such metallic brass heretofore have not been very successful and those skilled in the art have sought without appreciable results to improve on the metallic brass recovery. I have discovered how to significantly increase such recovery.

The skimmings of a brass melting furnace may consist of approximately equal parts of metal and metal oxides. I heat the skimmings to a temperature somewhat above the melting point of the metal in a suitable furnace. I prefer to employ a gas fired furnace. The temperature to which the skimmings are heated depends on the metal content. A typical temperature might be of the order of 2100° F. I add to the skimmings in the furnace a fluxing agent comprising oxide of boron and sodium carbonate which causes formation of a slag blanket. Metallic brass coalesces into droplets which settle from the slag blanket. The oxide of boron may be contained, for example, in anhydrous Rasorite concentrate, hydrous Rasorite, colemanite or other compound containing a substantial percentage of oxide of boron.

It is desirable that the viscosity of the slag blanket be minimized as a high viscosity slag blanket restricts or inhibits the coalescing of metallic brass into droplets which settle from the slag blanket. I minimize or reduce the viscosity of the slag blanket by adding in the furnace metal which remains in the slag blanket and combines with oxygen. The added metal may comprise at least one of the metals of the group consisting of calcium, aluminum, silicon, manganese and titanium. The result of such addition is significant increase in the amount of metallic brass which coalesces into droplets which settle from the slag blanket.

I obtain optimum results when the components are present in the heating step in approximately the following proportions: 25,000 pounds of skimmings, 715 to 1430 pounds of oxide of boron (which may be derived, for example, from 1100 to 2200 pounds of anhydrous Rasorite concentrate), 100 pounds of sodium carbonate and 50 pounds of metal which remains in the slag blanket and combines with oxygen. The amount of oxide of boron employed depends upon the amount of copper, lead and zinc oxides in the material from which the metal is to be recovered. For example, material containing 25% oxides would require less oxide of boron than material containing 50% oxides.

While I have described a present preferred method of practicing the invention it is to be distinctly understood that the invention is not limited thereto but may be otherwise variously practiced within the scope of the following claims.

I claim:
1. A method of recovering metallic brass from the skimmings delivered from a brass melting furnace comprising heating the skimmings to a temperature somewhat above the melting point of the metal content of the skimmings in the presence of a fluxing agent comprising oxide of boron and sodium carbonate which causes formation of a slag blanket and adding at least one of the metals of the group consisting of calcium, aluminum, silicon, manganese and titanium which remains in the slag blanket, reduces metal oxides in the slag blanket consequently lowering the viscosity of the slag blanket, and thereby significantly increases the amount of metallic brass which coalesces into droplets which settle from the slag blanket.

2. A method of recovering metallic brass from the skimmings delivered from a brass melting furnace as claimed in claim 1 in which the skimmings of the brass melting furnace consist of approximately equal parts of metal and metal oxides.

3. A method of recovering metallic brass from the skimmings delivered from a brass melting furnace as claimed in claim 1 in which in the heating step the components are present in approximately the following proportions: 25,000 pounds of skimmings, 715 to 1430 pounds of oxide of boron, 100 pounds of sodium carbonate and 50 pounds of metal which remains in the slag blanket and combines with oxygen.

4. A method of recovering metallic brass from the skimmings delivered from a brass melting furnace as claimed in claim 1 in which the skimmings of the brass melting furnace consist of approximately equal parts of metal and metal oxides and in the heating step the components are present in approximately the following proportions: 25,000 pounds of skimmings, 715 to 1430 pounds of oxide of boron, 100 pounds of sodium carbonate and 50 pounds of at least one of the metals of the group consisting of calcium, aluminum, silicon, manganese and titanium.

References Cited

UNITED STATES PATENTS

| 1,769,986 | 7/1930 | Corson | 75—76 |
| 1,837,432 | 12/1931 | Hanak | 75—76 |
| 1,921,180 | 8/1933 | Evans | 75—76 |
| 1,921,868 | 8/1933 | Evans | 75—76 X |
| 1,943,738 | 1/1934 | Moyer | 75—76 |

L. DEWAYNE RUTLEDGE, Primary Examiner

J. E. LEGRU, Assistant Examiner

U.S. Cl. X.R.

75—72, 94

UNITED STATES PATENT OFFICE
CERTIFICATE OF CORRECTION

Patent No. 3,669,647       Dated June 13, 1972

Inventor(s) Alfred R. Barbour

It is certified that error appears in the above-identified patent and that said Letters Patent are hereby corrected as shown below:

Column 1, line 4, in the title, "SKIMMING" should be --SKIMMINGS--.

Signed and sealed this 26th day of September 1972.

(SEAL)
Attest:

EDWARD M. FLETCHER, JR.
Attesting Officer

ROBERT GOTTSCHALK
Commissioner of Patents